United States Patent [19]

von Halasz

[11] 3,917,726

[45] Nov. 4, 1975

[54] PROCESS FOR PREPARING PERFLUORO-2-METHYL-PENTANE

[75] Inventor: Sigmar-Peter von Halasz, Kelkheim, Taunus, Germany

[73] Assignee: Hoechst Aktiengesellschaft, Frankfurt am Main, Germany

[22] Filed: June 20, 1974

[21] Appl. No.: 481,462

[30] Foreign Application Priority Data

June 23, 1973 Germany............................ 2332088

[52] U.S. Cl............................ 260/653.9; 260/653.3
[51] Int. Cl.²......................................... C07C 17/04
[58] Field of Search................................. 260/653.9

[56] References Cited
OTHER PUBLICATIONS

Ishikawa et al., Chem. Abstracts, 78, 57656h, (1973).
Mailen et al., Chem. Abstracts, 61, 10013e, (1964).

*Primary Examiner*—D. Horwitz
*Attorney, Agent, or Firm*—Curtis, Morris & Safford

[57] ABSTRACT

Elementary fluorine in liquid phase is added at temperatures from −30° to −120°C to perfluoro-2-methyl-pentenes to yield perfluoro-2-methyl-pentane.

3 Claims, No Drawings

PROCESS FOR PREPARING PERFLUORO-2-METHYL-PENTANE

Perfluoro-2-methyl-pentane is one of the substances classified as perfluoro-alkanes, the particular thermal and chemical stability and electric properties of which are outstanding. Therefore, the art is interested in a simple and efficient process for their preparation.

For quite a while perfluoro-2-methyl-pentane is already known to be obtained by fluorination of 2-methyl-pentane with cobalt-trifluoride (V.E. Stiles and G. H. Cady, J. Am.Chem.Soc. 74, 3771 (1952)). This process requires a costly equipment for the vapor phase fluorination as well as a complicated distillation for separating isomers and other by-products boiling at the same temperature range. The yields in pure perfluoro-2-methyl-pentane are unsatisfactory. Furthermore, for each C-F-compound formed upon this reaction an equivalent quantity of hydrogen fluoride is formed, too. Perfluoro-2-methyl-pentane can further be prepared by reacting hexafluoropropene with nitrogen trifluoride in an autoclave at 500°C (R.D.Dresdner, F.N.Tlumac and J.A. Young, J.Am.Chem.Soc. 82, 5831 (1960)) and by exposure of hexafluoropropene to irradiation in the presence of perfluoro-N-fluoro-piperidine (R.E. Banks, K.Mullen, W.J. Nicholson, C.Oppenheim and A.-Prakash, J.C.S. Perkin I (1972), 1098). These two syntheses yield perfluoro-2-methyl-pentane at rates of about 10 % of the theory only and always require separation of the perfluoro-2-methyl-pentane from the isomeric perfluoro-2,3-dimethyl butane being also formed.

All those skilled in the art know that a reaction of perfluoroolefine with elementary fluorine mostly yields but poor results in the corresponding alkanes perfluorinated (W.A. Sheppard and C.M. Sharts, Organic Fluorine Chemistry, 1st edition, pg. 53, Benjamin, New York 1969). Since the reaction according to the equation

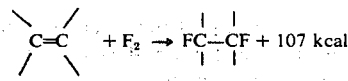

sets free a considerable amount of heat, formation of fragmentation products is quite frequent.

Subject of the present invention is now a process for preparing perfluoro-2-methyl-pentane (I) wherein perfluorohexenes having the formula

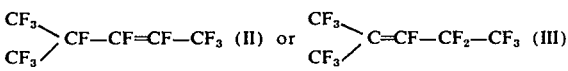 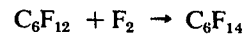

or their mixtures in liquid phase react with elementary fluorine at temperatures of from −30° to −120°C.

The reaction can be carried out in the presence of inert solvents and/or inert gases, operating in their absence is, however, preferred. Since the perfluoroolefines get viscous at approx. −85°C and the final product, perfluoro-2-methyl-pentane, at −100°C, and so as to obtain the best possible yield rate, a reaction temperature range of from −85° to −60°C, particularly from −80° to −70°C is preferred. In the case that lower-melting isomeric mixtures of the olefines II and III are used, as well as during the possibly continuous reaction, this limit may drop to approx. −120°C, as soon as a sufficient quantity of perfluoro-hexane has formed, even though additional solvents be absent.

The reaction according to the present invention is generally performed in the same way as known gas-liquid-reactions, wherein the fluorine is passing through a frit or an equivalent distribution device and fed as small bubbles into the lower end of a liquid column which is formed by the hexenes of formulae II and/or III. This liquid column is best suitable having a height greater than its diameter, preferably by five times. The gas bubbling up guarantees a thorough mixing. It is possible to add a supplementary mechanical agitation which does not contribute any advantage, however.

The height of the liquid in the column is not of critical importance to the course of the reaction according to the invention. But, so as to avoid any waste gas problems, it is advantageous to adjust its height — depending on the reaction temperature and the dosage of the fluorine — in such a way that at least at the beginning of the reaction all or practically all of the fluorine is reacted. A further advantage is an embodiment where a second similar or identical reaction vessel is connected behind the first one, also filled with perfluoro-hexene and where at reaction temperatures fluorine not yet reacted within the first reaction zone of the invention is submitted to further reaction. Therefore, the process of the invention is continuously operating at its best, in known manner, for example by addition of fresh perfluorohexene into the upper part of the reactor, removing the fluorination product at the lower tip and subsequently separating the initial product and the fluorination product by distillation. The dosage of the fluorine is not a critical factor either, provided that a regular bubbling of the fluorine to be introduced be guaranteed. It is of advantage to add fluorine as fast as it is reacted i.e. the higer the layer height of the hexene introduced, the larger can be the quantity of fluorine used. The process is preferably carried out at norml pressure, though overpressure is also permitted. It is useful to perform the reaction in the absence of light (fragmentation increases).

As far as the material for the reactor and the frit are concerned, any material of sufficient resistance to fluorine may be used, such as steel, copper, platinum; it is also possible to line the reactor e.g. with polytetrafluorethylene. Provided that the fluorine is sufficiently free of hydrogen fluoride, glass, quartz or ceramics are also materials to be used advantageously.

Upon the additive reaction according to the following equation $$C_6F_{12} + F_2 \rightarrow C_6F_{14}$$

are used as perfluorohexenes the following olefines in their pure form or as isomeric mixture:

 perfluoro-2-methyl-3-pentene, boiling point 47° − 48°C/760 torr

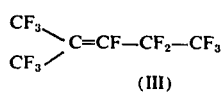 perfluoro-2-methyl-2-pentene

By adding fluorine to compounds II or III which differ only in respect to the position of their double bonds, perfluoroisohexane (I) of formula

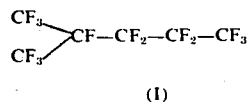

Perfluoro-2-methyl-pentane, boiling point 57 – 57.5°C/750 torrs is formed quantitatively at temperatures of preferably from −80° to −70°C (cf. example), having a uniform structure.

Perfluoro-2-methyl-pentane (I) which can be obtained very pure and easily by the shown method, represents a valuable product; its thermal and chemical stability and its electrical properties recommend it for being used as hydraulic liquid at low temperatures, as dielectric, turbine fluid, heat transfer medium, or refrigerating agent of electric or mechanic systems. Furthermore, compound (I) represents a general purpose inert solvent or reaction medium.

As compared to known processes for preparing perfluoro-2-methyl-pentane the process of the present invention represents an improvement of the yield and a simplification of the work-up.

The following example illustrates the invention:

EXAMPLE 1

The experimental arrangement for elementary fluorination of the olefines II and III consists in two traps, made of "Duran" glass (Reg. trade mark), being set up one behind the other, dried and rinsed with nitrogen, each of them having a volume of abt. 300 ml. Into the first trap A - equipped with an interior thermometer and a gas inlet tube reaching down to the bottom of the trap and ending in a glass frit (size G 1) — 150 g (0.5 mole) of perfluorohexene (isomeric proportion from II : III = 95.0 : 4.2 %) having a layer height of 9 cm are first introduced on top of the glass frit. Trap A is carefully cooled down to a temperature of −78°C from the outside by means of a mixture of $CO_2/CCl_3F$. The second trap B — also equipped with a glass frit — is filled with the same mixture of perfluorohexene and also cooled down to −78°C. Its purpose is the absorption of excess fluorine.

Elementary fluorine is supplied from a commercial steel bottle, measured by means of a previously gauged differential pressure flow meter and introduced into trap A. Before the flow meter and between the traps A and B each an ascending tube manometer is set up for observing the dynamic pressure building up and as a safety valve. The measuring devices are filled in with "Voltalef" oil, (Reg. Trade mark), 10 S (Polytrifluoro-chloro-ethylene); the ground joints are sealed with Voltalef, Graisse 90 (Messrs. Ugine Kuhlmann).

In course of 21 hours and at a rate of 0.7 l/h totally 0.66 mole of fluorine are now introduced. The content of trap A, at the end of the test, increased by 19 g.

The gaschromatographic analysis (5.0 m 10 % hexafluoropropenepoxide-polymers on chromosorb W-AW DMCS 80–100 mesh, 80°C isothermal, 60 ml He/min.) shows the follwoing composition (area-percentage) of the crude product:

| | |
|---|---|
| $C_6F_{14}$ (I) | 99.0% |
| $C_6F_{12}$ (II) + (III) | 0.1 % |
| Miscellaneous | 0.8 % |

Upon distillation 165 g (0.49 mole) of perfluoro-2-methylpentane (I) are obtained as a uniformly boiling fraction, at a boiling point of from 57°–57.5°C / 750 torrs, corresponding to a 99 % yield calculated on the perfluorohexene reacted (introduced at 99 % of purity).

Elementary analysis: $C_6F_{14}$ (338.1); calc.: c 21.32%; F 78.68%; found: C 21.8 %; F 78.2 %.

mole-mass 319 (M - F, by mass spectroscopy) $n^{24}$ (Ne 632.8 nm) 1.199

What is claimed is:

1. Process for preparing perfluoro-2-methyl-pentane

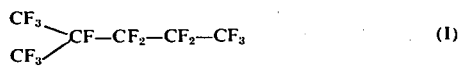

wherein perfluorohexenes of the formulae

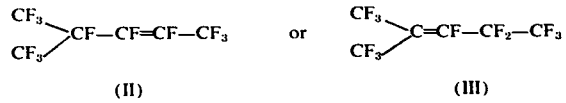

or their mixtures in liquid phase are reacted with elementary fluorine at temperatures of from −30° to −120°C.

2. Process according to claim 1, wherein fluorine or perfluorohexene are used without diluents.

3. Process according to either one of claims 1 or 2, wherein the reaction is performed at temperatures of from −85° to −60°C, perferably from −80° to −70°C.